US010648370B2

(12) United States Patent
Sung et al.

(10) Patent No.: US 10,648,370 B2
(45) Date of Patent: May 12, 2020

(54) POWER PLANT AND METHOD OF CONTROLLING SAME

(71) Applicant: DOOSAN HEAVY INDUSTRIES & CONSTRUCTION CO., LTD., Changwon-si, Gyeongsangnam-do (KR)

(72) Inventors: Hwa Chang Sung, Seoul (KR); Sang Hyeun Kim, Yongin-si (KR); Song Hun Cha, Osan-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 0 days.

(21) Appl. No.: 16/013,941

(22) Filed: Jun. 21, 2018

(65) Prior Publication Data

US 2019/0048746 A1 Feb. 14, 2019

(30) Foreign Application Priority Data

Aug. 9, 2017 (KR) .......................... 10-2017-0101038

(51) Int. Cl.
*F01K 13/02* (2006.01)
*F01K 7/16* (2006.01)
(Continued)

(52) U.S. Cl.
CPC ................ *F01K 13/02* (2013.01); *F01K 7/16* (2013.01); *F01K 9/00* (2013.01); *F01K 13/003* (2013.01);
(Continued)

(58) Field of Classification Search
CPC .......... F01K 13/02; F01K 25/103; F01K 7/16; F01K 7/32; F01K 19/02; F01K 19/04;
(Continued)

(56) References Cited

U.S. PATENT DOCUMENTS 3,971,211 A * 7/1976 Wethe ........................ F01K 7/32
60/39.181
2012/0047892 A1* 3/2012 Held ........................ F01K 3/185
60/652
(Continued)

FOREIGN PATENT DOCUMENTS

| JP | 2013-057264 A | 3/2013 |
| JP | 2015-050778 A | 3/2015 |
| KR | 2016-0123278 A | 10/2016 |

OTHER PUBLICATIONS

Kimzey, G. "Supercritical CO2 Brayton Cycles and Their Application as a Bottoming Cycle" (Year: 2012).*

*Primary Examiner* — Mark A Laurenzi
*Assistant Examiner* — Xiaoting Hu
(74) *Attorney, Agent, or Firm* — Invenstone Patent, LLC

(57) ABSTRACT

Disclosed are a power plant that uses a synchronous generator using a working fluid for generation of electric power, and a method of controlling the power plant, the power plant and the control method having an advantage of preventing damage to the power plant during synchronization with an electrical grid. The power plant comprises a pump for compressing a working fluid, a heat exchanger for heat transfer from an external heat source to the working fluid transferred from the pump, and a power turbine generator for generating a rotational force by using the working fluid heated by the heat exchanger, generating electricity using the rotational force, and supplying the electricity to an electrical grid.

15 Claims, 6 Drawing Sheets

(51) Int. Cl.
*F01K 25/10* (2006.01)
*F01K 13/00* (2006.01)
*F01K 9/00* (2006.01)
*H02J 3/00* (2006.01)
*H02J 15/00* (2006.01)
F04D 25/04 (2006.01)

(52) U.S. Cl.
CPC .............. *F01K 25/103* (2013.01); *H02J 3/00* (2013.01); *H02J 15/003* (2013.01); *F04D 25/04* (2013.01)

(58) Field of Classification Search
CPC ... F01K 9/00; F01K 9/02; F01K 13/00; F01K 13/003
See application file for complete search history.

(56) References Cited

U.S. PATENT DOCUMENTS

| | | | |
|---|---|---|---|
| 2014/0208750 A1* | 7/2014 | Vermeersch | F01K 13/02 60/646 |
| 2014/0208751 A1* | 7/2014 | Bowan | F01K 7/165 60/647 |
| 2015/0330256 A1* | 11/2015 | Adachi | F01K 7/16 60/646 |
| 2016/0003108 A1* | 1/2016 | Held | F01K 23/10 60/517 |
| 2017/0152762 A1* | 6/2017 | Murakami | F01K 13/003 |

* cited by examiner

POWER PLANT AND METHOD OF CONTROLLING SAME

CROSS-REFERENCE TO RELATED PATENT APPLICATION

This application claims the benefit of Korean Patent Application No. 10-2017-0101038, filed on Aug. 9, 2017, the disclosure of which is incorporated herein in its entirety by reference.

BACKGROUND OF THE DISCLOSURE

Field of the Disclosure

The present disclosure relates to a power plant. More particularly, the present disclosure relates to a power plant for generation of electricity by using a supercritical working fluid.

Description of the Related Art

Generally, a synchronous generator refers to a turbine generator generating a large amount (for example, several megawatts) of electricity and supplying the electricity to businesses or homes. The synchronous generator generates and transfers electricity to an electrical grid having a variable load or demand with time. To smoothly supply electricity to the electrical grid, the frequency of the synchronous generator must be adjusted to match the frequency of the electrical grid. When the frequency of the synchronous generator and the frequency of the electrical grid do not match, the synchronous generator may be damaged.

When the usage of electricity (e.g., loads) in the electrical grid rapidly increases, the synchronous generator may operate at an increased speed for generation of a larger amount of electricity, resulting in an overspeed condition. In this case, in the synchronous generator, moving parts, such as a turbine, an electric generator, and a shaft, are likely to be subjected to high mechanical stresses because of the high operation speed.

SUMMARY OF THE DISCLOSURE

Particularly, in the case of a synchronous generator that generates electricity using a supercritical working fluid, the temperature and pressure of the working fluid are likely to increase to excessive levels under the overspeed condition, which also may cause damage to electric generators.

For this reason, when the synchronous generator using the supercritical working fluid is employed in a power plant, there has been a need for a technique to control the power plant, such as preventing overspeeding at the time of performing synchronization with the electrical grid to prevent damage to the parts of the power plant.

The present disclosure is intended to provide a power plant employing a synchronous generator that uses a working fluid for generation of electricity and a control method thereof, the plant and method being capable of preventing damage to the power plant during synchronization with an electrical grid.

The present disclosure provides a power plant comprising: a pump configured to compress a working fluid; a heat exchanger apparatus configured to cause heat exchange between the working fluid supplied by the pump and an external heat source; a power turbine generator configured to generate a rotational force by using the working fluid heated through the heat exchange performed in the heat exchanger apparatus, to generate electricity using the rotational force, and to supply the electricity to an electrical grid; a condenser configured to condense the working fluid discharged from the power turbine generator to become a liquid state; a working fluid supply line connected to the heat exchanger apparatus and the power turbine generator at respective ends thereof, thereby providing a flow path from the heat exchanger apparatus to the power turbine generator for the working fluid; a pressure sensor installed on the working fluid supply line and configured to measure a pressure of the working fluid fed into the power turbine generator; a working fluid recovery line connected to the power turbine generator and the condenser at respective ends thereof, thereby providing a flow path from the power turbine generator to the condenser for the working fluid; a bypass line connected to the working fluid supply line and the working fluid recovery line at respective ends thereof, thereby providing a direct flow path from the working fluid supply line to the working fluid recovery line for a portion of the working fluid such that the portion of the working fluid bypasses the power turbine generator; a first control valve installed on the working fluid supply line and configured to control a flow rate of the working fluid flowing through the working fluid supply line; a second control valve installed on the bypass line and configured to control a flow rate of the working fluid flowing through the bypass line; and a controller configured to control the first control valve and the second control valve according to the measurement value of the pressure sensor and an operational state of the power turbine generator.

The controller may comprise a first controller configured to control the first control valve according to a turbine rotation speed of the power turbine generator and a second controller configured to control the second control valve according to the measurement value of the pressure sensor during a first operation session in which synchronization with the electrical grid is performed. The first controller may control the first control valve according to the measurement value of the pressure sensor during a second operation session in which the power plant operates in synchronization with the electrical grid after the synchronization is successfully performed in the first operation session. During the second operation session, the first controller increases an opening of the first control valve when the measurement value of the pressure sensor reaches a lower limit of a normal range, and the second controller increases an opening of the second control valve when the measurement value of the pressure sensor reaches an upper limit of the normal range. During a third operation session in which a shut-down operation is performed, the first controller completely closes the opening of the first control valve and the second control valve increases the opening of the second control valve.

Preferably, the power plant may further comprise a recuperator installed on the working fluid recovery line and configured to cool the working fluid flowing through the working fluid recovery line by causing heat exchange between the working fluid conveyed from the pump and the working fluid flowing through the working fluid recovery line; the heat exchanger apparatus may comprise a first heat exchanger configured to heat the working fluid by causing heat exchange between the working fluid conveyed from the pump and an external heat source and a second heat exchanger configured to heat a portion of the working fluid conveyed from the pump by causing heat exchange between the portion of the working fluid, which passes through the recuperator, and an external heat source; the external heat source may be a hot exhaust gas; the first heat exchanger and the second heat exchanger may be spaced from each other and arranged in series so that the hot exhaust gas serving as the external heat source sequentially passes through the first heat exchanger and the second heat exchanger, thereby undergoing sequential two stages of heat exchange to transfer thermal energy thereof to the working fluid; the pump may comprise a centrifugal pump configured to increase a pressure of the working fluid conveyed from the condenser for supply of the pressure-increased working fluid and an auxiliary turbine coaxially connected a rotational shaft of the centrifugal pump to rotate the rotational shaft by generating a rotational force by using the working fluid conveyed from the second heat exchanger.

The power plant may further comprise a first fluid line connected to an outlet of the auxiliary turbine and the working fluid recovery line at respective ends thereof to provide a flow path from the auxiliary turbine to the working fluid recovery line for the working fluid discharged from the auxiliary turbine.

The heat exchanger apparatus may comprise: a first heat exchanger configured to heat a portion of the working fluid conveyed from the pump by causing heat exchange between the working fluid passing through the recuperator and an external heat source; a second heat exchanger configured to heat the working fluid conveyed from the pump by causing heat exchange between the working fluid conveyed from the pump and an external heat source; a second fluid line connected to the first heat exchanger and the second heat exchanger at respective ends thereof to provide a flow path from the second heat exchanger to the first heat exchanger for the working fluid passing through the second heat exchanger; a third fluid line connected to the pump and the second fluid line at respective ends thereof to provide a flow path that guides the working fluid passing through the pump to the second fluid line via the recuperator; a fourth fluid line connected to the second fluid line and the working fluid recovery line connected to a rear end of the recuperator, at respective ends thereof; a second recuperator installed on the fourth fluid line and configured to cause heat exchange between the working fluid flowing through the fourth fluid line and the working fluid flowing through the working fluid recovery line; and an auxiliary turbine installed on the fourth fluid line to generate a driving force by using the working fluid flowing through the fourth fluid line.

The power plant may further comprise: a fourth fluid line connected to the second fluid line and the working fluid recovery line connected to a rear end of the recuperator, at respective ends thereof; a second recuperator installed on the fourth fluid line and causing heat exchange between the working fluid flowing through the fourth fluid line and the working fluid flowing through the working fluid recovery line; and an auxiliary pump installed on the fourth fluid line and configured to increase a pressure of the working fluid conveyed through the fourth fluid line, for supply of the resulting pressure-increased working fluid. Additionally, the power plant may further comprise a third heat exchanger installed on the second fluid line and configured to heat the working fluid flowing through the second fluid line by causing heat exchange between the working fluid flowing through the second fluid line and the external heat source; and a fifth fluid line connected to the second fluid line connected to a rear end of the third heat exchanger and the fourth fluid line at respective ends thereof.

The power plant according to the present disclosure may further comprise: a first heat exchanger configured to heat the working fluid that is first discharged from the pump and is then conveyed to the first heat exchanger through the recuperator by causing heat exchange between the working fluid passing through the recuperator and an external heat source; and a second heat exchanger arranged on one side of the first heat exchanger and configured to heat a heat medium passing through the first heat exchanger by using an external heat source, wherein the working fluid may be supercritical carbon dioxide.

According to another aspect of the present disclosure, there is provided a method of controlling the power plant described above, the method comprising: controlling a flow rate of the working fluid supplied to the power turbine generator by controlling the first control valve according to a turbine rotation speed of the power turbine generator before or during a first operation session in which synchronization with an electrical grid is performed; controlling a flow rate of the working fluid supplied to the power turbine generator by controlling the first control valve according to a measurement value of the pressure sensor during a second operation session in which the power plant operates in synchronization with the electrical grid after the synchronization is successfully performed; reducing increasing an opening of the first control valve when the measurement value of the pressure sensor reaches a lower limit of a normal range and increasing an opening of the second control valve when the measurement value of the pressure sensor reaches an upper limit of the normal range, during the second operation session; and completely closing the opening of the first control valve by using the first controller and increasing the opening of the second control valve by using the second controller during a third operation session in which a shut-down operation is performed.

According to the present disclosure, the power plant has an advantage of avoiding damage thereto when the power plant generating electricity by using a working fluid performs synchronization with an electrical grid.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE DISCLOSURE

Hereinafter, preferred embodiments of the present disclosure will be described in detail with reference to the accompanying drawings. Prior to giving the following detailed description of the present disclosure, it should be noted that the terms and words used in the specification and the claims should not be construed as being limited to ordinary meanings or dictionary definitions but should be construed in a sense and concept consistent with the technical idea of the present disclosure, on the basis that the inventor can properly define the concept of a term to describe its disclosure in the best way possible.

A power generation system using a supercritical working fluid operates in a closed cycle such that a working fluid used in the system for power generation is not discharged to outside. When supercritical carbon dioxide is used as the supercritical working fluid, exhaust gas emitted from a thermoelectric power station or the like can be use as the working fluid in the power generation system. It can be used not only for a standalone power generation system but also for a combined cycle power generation system associated with a thermoelectric power generation system.

The working fluid within a cycle sequentially passes through a pump and a heat exchanger. The working fluid is heated when it is flowing through the heat exchanger, thereby entering a supercritical state in which the working fluid has a high temperature and a high pressure. The supercritical working fluid drives a turbine. An electric generator is connected to the turbine, and the electric power produced by the electric generator connected to the turbine is supplied to an electrical grid after the electric generator is synchronized with a nearby electrical grid.

The carbon dioxide passing through the turbine is cooled when it is flowing through the heat exchanger to exchange heat, and the cooled carbon dioxide is reintroduced into the pump. In this way, the working fluid circulates within the cycle. The turbine may not be a single turbine. That is, a plurality of turbines may be present within the power plant. Likewise, a plurality of heat exchangers may be present within the power plant.

Supercritical working fluid power generation systems according to various embodiments of the present disclosure may be configured such that the entire working fluid flowing through a cycle is in a supercritical state, or such that a major portion of the working fluid is in a supercritical state and the remaining portion is in a subcritical state.

The working fluid used in the power plant of the present disclosure may be carbon dioxide or a gas mixture containing carbon dioxide. The working fluid may be used in a supercritical state inside the power plant. The working fluid can also be a combination of carbon dioxide and propane, a combination of carbon dioxide and ammonia, or one of other similar combinations.

Figure 1:
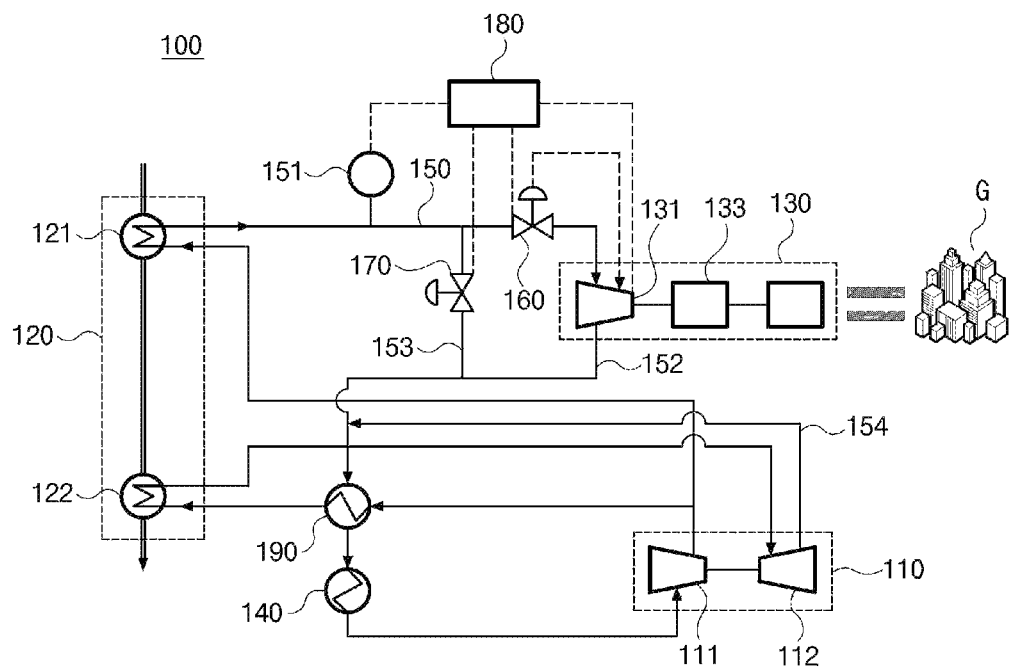
FIG. 1 is a schematic diagram illustrating a power plant according to a first embodiment of the present disclosure.

Referring to FIG. 1, a power plant 100 according to a first embodiment of the present disclosure is a system to generate electricity using a working fluid. The power plant 100 comprises a pump 110 that compresses a working fluid and sends the resulting compressed working fluid, a heat exchanger apparatus or a heat exchanger 120 that heats the working fluid by using an external heat source, a power turbine generator 130 that generates electricity by using the working fluid, a condenser 140 that cools and condenses the working fluid, a working fluid supply line 150 that provides a flow path for the working fluid so as to be conveyed to the power turbine generator 130, a pressure sensor 151 that measures the pressure of the working fluid, a working fluid recovery line 152 that conveys the working fluid to the pump 110, a bypass line 153 that allows a portion of the working fluid destined for the power turbine generator 130 to bypass the power turbine generator 130, a first and second control valves 160 and 170 that regulate a flow rate of the working fluid, and a controller 180 that controls the first and second control valves 160 and 170.

The pump 110 compresses the working fluid and supplies the compressed working fluid to the heat exchanger apparatus 120.

The pump 110 comprises a centrifugal pump 111 and an auxiliary turbine 112. The centrifugal pump 111 compresses the working fluid conveyed from the condenser 140 and supplies the compressed working fluid to the heat exchanger apparatus 120. The auxiliary turbine 112 is coaxially connected to a rotational shaft of the centrifugal pump 111, generates a rotational force by using the working fluid conveyed from the heat exchanger apparatus 120, and rotates the rotational shaft of the centrifugal pump 111 using the rotational force, thereby driving the centrifugal pump 111.

A first fluid line 154 is connected to an outlet of the auxiliary turbine 112 and a working fluid recovery line at a first and a second end thereof, respectively.

The first fluid line 154 conveys the working fluid discharged from the auxiliary turbine 112 to the working fluid recovery line.

The heat exchanger apparatus 120 causes heat exchange between the working fluid conveyed from the pump 110 and an external heat source, thereby heating the working fluid conveyed from the pump 110. The external heat source may be a hot exhaust gas that is a gas containing waste heat.

The heat exchanger apparatus 120 comprises a first heat exchanger 121 and a second heat exchanger 122. The first heat exchanger 121 causes heat exchange between the working fluid conveyed from the pump 110 and the external heat source, thereby heating the working fluid. The second heat exchanger 122 is spaced from the first heat exchanger 121. The first and second heat exchangers 121 and 122 are arranged side by side on a flow path of the exhaust gas. Therefore, the exhaust gas sequentially passes through the first heat exchanger 121 and the second heat exchanger 122, thereby heating the working fluid that sequentially passes through the first heat exchanger 121 and the second heat exchanger 122.

The second heat exchanger 122 heats the working fluid passing through a recuperator 190 by using the exhaust gas.

The power turbine generator 130 generates a rotational force by using the working fluid passing through the heat exchanger 120 and generates electricity by using the generated rotational force.

The power turbine generator 130 comprises a turbine 131 rotated by the working fluid and an electric generator (not shown) generating electricity by using the rotational force provided by the turbine 131. The generator supplies electricity to a nearby electrical grid G when needed. A gear box 133 for transferring the rotational force generated by the turbine 131 to the electric generator is installed between the turbine 131 and the electric generator.

The working fluid supply line 150 is installed between the power turbine generator 130 and the heat exchanger apparatus 120. The working fluid supply line 150 is connected to the heat exchanger apparatus 120 at a first end thereof and to the power turbine generator 130 at a second end thereof so that the working fluid passing through the heat exchanger apparatus 120 can be supplied to the power turbine generator 130.

The pressure sensor 151 is installed on the working fluid supply line 150, particularly on the front side of the power turbine generator 130. The pressure sensor 151 measures the pressure of the working fluid supplied to the power turbine generator 130 and transmits the measurement value to the controller 180.

The working fluid passing through the power turbine generator 130 is conveyed to the condenser 140 through the working fluid recovery line 152.

The condenser 140 is disposed on the rear side of the power turbine generator 130 and is connected to the power turbine generator 130 through the working fluid recovery line 152. The condenser 140 cools the working fluid discharged from the power turbine generator 130.

The working fluid recovery line 152 is installed between the power turbine generator 130 and the condenser 140. The working fluid supply line 152 is connected to the power turbine generator 130 at a first end thereof and to the condenser 140 at a second end thereof so that the working fluid discharged from the power turbine generator 130 can be supplied to the condenser 140.

The recuperator 190 is installed on the working fluid supply line 152 connected to the condenser 140. The recuperator 190 causes heat exchange between the working fluid transferred through the working fluid recovery line 152 and the working fluid conveyed from the pump 110, thereby cooling the working fluid transferred through the working fluid recovery line 152 and supplying the resulting working fluid to the pump 110.

A first end of the bypass line 153 is connected to the working fluid supply line 150 connected to an inlet of the power turbine generator 130. The first end of the bypass line 153 is connected to the working fluid supply line 150, and a second end of the bypass line 153 is connected to the working fluid recovery line 152 so that a portion of the working fluid flowing toward the power turbine device 130 may bypass the power turbine generator 130.

A first control valve 160 is installed on a segment of the working fluid supply line 150, where the segment ranges from the power turbine generator 130 to a contact point of the working fluid supply line 150 and the bypass line 153. The first control valve 160 regulates the flow rate of the working fluid flowing through the working fluid supply line 150, thereby controlling the flow rate and the pressure of the working fluid supplied to the power turbine generator 130.

In addition, a second control valve 170 is installed on the bypass line 153, thereby controlling the flow rate of the working fluid flowing through the bypass line 153.

The first and second control valves 160 and 170 are controlled by the controller 180.

The controller 180 controls the first and second control valves 160 and 170 based on operational states of the power turbine generator 130 and the measurement values of the pressure sensor 151. The controller 180 comprises a first controller and a second controller.

The controller 180 controls the first and second control valves 160 and 170 based on different criteria, according whether the power plant operates in synchronization with an electrical grid or not.

The first controller controls the first control valve 170 valve 160 according the turbine rotation speed of the power turbine generator before or during a first operation session in which synchronization with the electrical grid is performed. That is, the first controller performs control to increase the flow rate of the working fluid supplied to the power turbine generator 130 to follow the rotational speed of the turbine in the power turbine generator 130 until the rotational speed of the turbine reaches a target value.

The first controller completely closes the first control valve 160 to block the working fluid fed into the power turbine generator 130 when the power turbine generator 130 enters an overspeed state.

The second controller controls the second control valve 170 according to the measurement value of the pressure sensor 151 before and during the first operation session in which synchronization with the electrical grid G is performed. When the measurement value of the pressure sensor 151, namely, the inlet pressure of the power turbine generator 130, rises, the second controller increases the opening of the second control valve 170 to increase a bypass flow rate of the working fluid flowing through the bypass line.

When the power turbine generator 130 enters the overspeed state, the second controller fully opens the second control valve 170 to cause the whole working fluid to bypass the power turbine generator 130 so that the working fluid may flow to the recuperator.

On the other hand, during a second operation session, which is an after-synchronization session where the power plant operates in synchronization with the electrical grid G after the synchronization with the electrical grid G is successfully performed through the first operation session, the first controller controls the first control valve 160 according to the measurement value of the pressure sensor 151. That is, when the synchronization with the electrical grid is successfully performed and, as a result, the electric power generated by the power turbine generator 130 is normally transferred to the electrical grid, the control mode automatically switches from a first mode in which the first controller controls the first control valve 160 based on the rotational speed of the turbine in the power turbine generator 130 to a second mode in which the first controller controls the first control valve 160 based on the inlet pressure of the power turbine generator 130, the pressure being measured by the pressure sensor 151. Although the switching from the first mode to the second mode is described as being performed automatically by the first controller in the present embodiment, the user may manually perform the switching from the first mode to the second mode.

Figure 2:
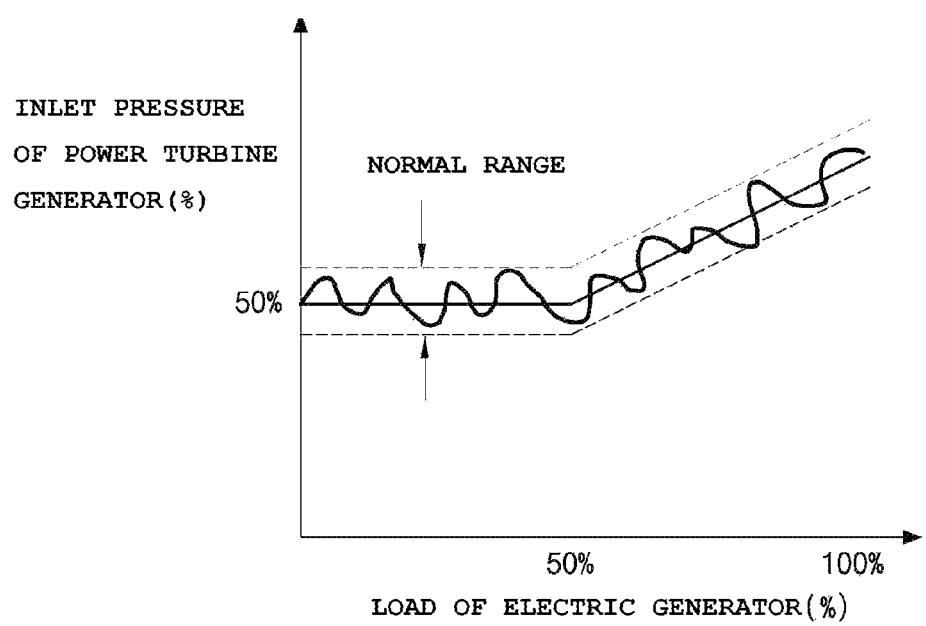
FIG. 2 is a graph showing a relationship between an inlet pressure of a power turbine generator and a load of an electric generator.

As illustrated in FIG. 2, when the power turbine generator 130 operates in synchronization with the electrical grid G, e.g., during the second operation session, the first controller increases the opening of the first control valve 160 when the inlet pressure of the power turbine generator 130, which is measured by the pressure sensor 151, reaches the lower limit of a normal range, to increase the flow rate of the working fluid supplied to the power turbine generator 130. That is, the inlet pressure of the power turbine generator 130 is increased.

When the inlet pressure of the power turbine generator 130, which is measured by the pressure sensor 151, reaches the upper limit of the normal range, the second controller increases the opening of the second control valve 170 to increase the flow rate of the working fluid flowing through the bypass line. Thus, the inlet pressure of the power turbine generator 130 is lowered.

In the case where the external heat source is obtained from waste heat as described in the present embodiment, if the heat source suddenly fluctuates, the fluctuation may negatively affect the stable operation of the power turbine generator. Therefore, in order to operate the power plant more stably, the control valves 160 and 170 are controlled with reference to different pressure reference values, respectively.

When the supply of the external heat source suddenly decreases, the inlet pressure of the power turbine generator 130 may rapidly and dramatically drop. When the inlet pressure of the power turbine generator 130 reaches the lower limit of the normal range, the first controller increases the opening of the first control valve 160 so that the inlet pressure of the power turbine generator 130 can be maintained at a level higher than the lower limit of the normal range. That is, when the inlet pressure of the power turbine generator 130 is suddenly lowered, the first controller increases the opening of the first control valve 160 to prevent a sudden pressure drop at the inlet of the power turbine generator 120. In the present embodiment, it is described that the first controller increases the opening of the first control valve 160 when the inlet pressure of the power turbine generator 130 reaches the lower limit of the normal range. However, the first controller may control the first control valve with reference to a different pressure level that is slightly higher than the lower limit of the normal range of the inlet pressure of the power turbine generator 130.

On the other hand, when the supply of the external heat source suddenly increases, the inlet pressure of the power turbine generator 130 may rapidly and dramatically increase. When the inlet pressure of the power turbine generator 130 reaches the upper limit of the normal range, the second controller increases the opening of the second control valve 170 so that the inlet pressure of the power turbine generator 130 can be maintained at a level lower than the upper limit of the normal range. In the present embodiment, the second controller may increase the opening of the second control valve 170 when the inlet pressure of the power turbine generator 130 reaches the upper limit of the normal range. However, the second controller may control the second control valve 170 with reference to a different pressure level that is slightly lower than the upper limit of the normal range of the inlet pressure.

During a third operation session in which the power plant 100 is shut down, namely, when a shutdown command is issued, the first controller closes the opening of the first control valve 160 completely. At this time, the second controller gradually increases the opening of the second control valve 170 according to the inlet pressure of the power turbine generator 130, which is measured by the pressure sensor 151.

When an emergency shutdown situation occurs due to an external emergency, the first controller closes the opening of the first control valve 160 completely and the second controller fully opens the opening of the second control valve 170, thereby preventing the breakage of the power turbine generator.

Although the first embodiment of the present disclosure provides a control example in which the controller comprises the first controller and the second controller that control the first and second control valves 160 and 170, respectively, it is also possible that the first and second control valves 160 and 170 are controlled by a single controller.

Figure 3:
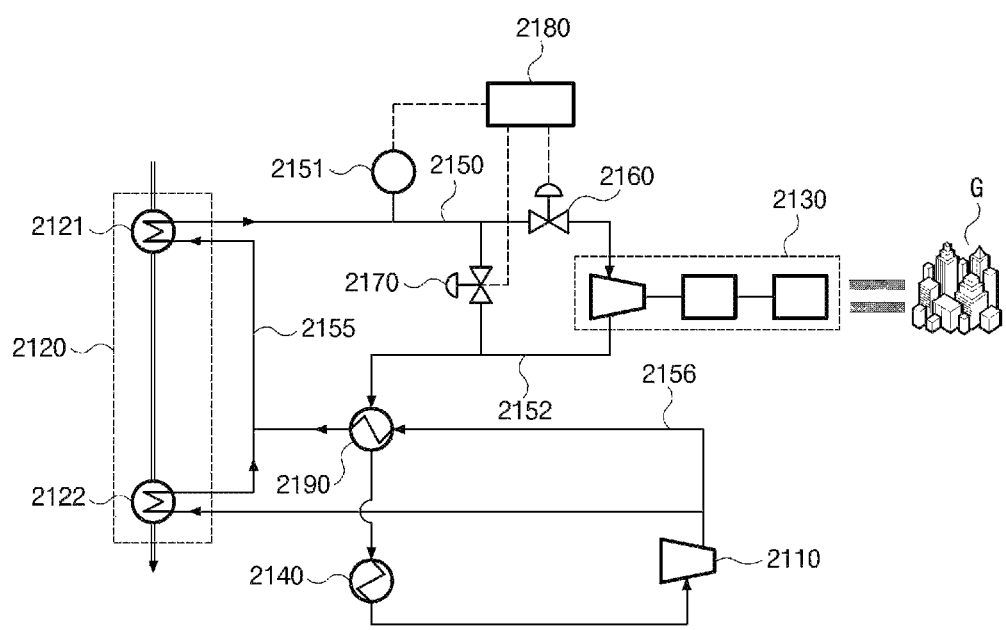
FIG. 3 is a schematic diagram illustrating a power plant according to a second embodiment of the present disclosure.

FIG. 3 is a schematic diagram illustrating a power plant according to a second embodiment of the present disclosure.

Referring to FIG. 3, according to the second embodiment of the present disclosure, a power plant comprises a pump 2110, a heat exchanger apparatus 2120, a power turbine generator 2130, a condenser 2140, a working fluid supply line 2150, a pressure sensor 2151, a working fluid recovery line 2152, a bypass line allowing a portion of the working fluid to bypass the power turbine generator 2130, a first and second control valves 2160 and 2170, and a controller 2180 for controlling the first and second control valves 2160 and 2170.

The power plant according to the second embodiment of the present disclosure is established by modifying the configuration of the heat exchanger apparatus of the power plant according to the first embodiment described above.

Among the components of the power plant according to the second embodiment of the present disclosure, a description of the same components as those of the first embodiment described above will be omitted and thus only the heat exchanger apparatus 2120 which is different from the heat exchanger apparatus of the first embodiment will be described below.

The heat exchanger apparatus 2120 comprises a first heat exchanger 2121, a second heat exchanger 2122, a second fluid line 2155, and a third fluid line 2156.

The second heat exchanger 2122 heats a working fluid by causing heat exchange between working fluid conveyed from the pump 2110 and an external heat source. The working fluid heated by the second heat exchanger 2122 is then transferred to the first heat exchanger 2121 through the second fluid line 2155.

The first heat exchanger 2121 is arranged in series with the second heat exchanger 2122, thereby heating the working fluid flowing through the first heat exchanger 2121 by using the external heat source (for example, hot exhaust gas) having passed through the second heat exchanger 2122.

A first end of the second fluid line 2155 is connected to the first heat exchanger 2121, and a second end thereof is connected to the second heat exchanger 2122 so that the working fluid passing through the second heat exchanger 2122 can be conveyed to the first heat exchanger 2121.

A portion of the working fluid discharged from the pump 2110 is directly conveyed to the second heat exchanger 2122. The rest of the working fluid is conveyed to the second fluid line 2155 via a recuperator 2190, mixed with the working fluid having passed through the second heat exchanger 2122, and conveyed to the first heat exchanger 2121.

The third fluid line 2156 is connected to the pump 2110 at a first end thereof and connected to the second fluid line 2155 at a second end thereof. Thus, a portion of the working fluid discharged from the pump 2110 is heated by the recuperator 2190, and the heated working fluid is conveyed to the second fluid line 2155.

Figure 4:
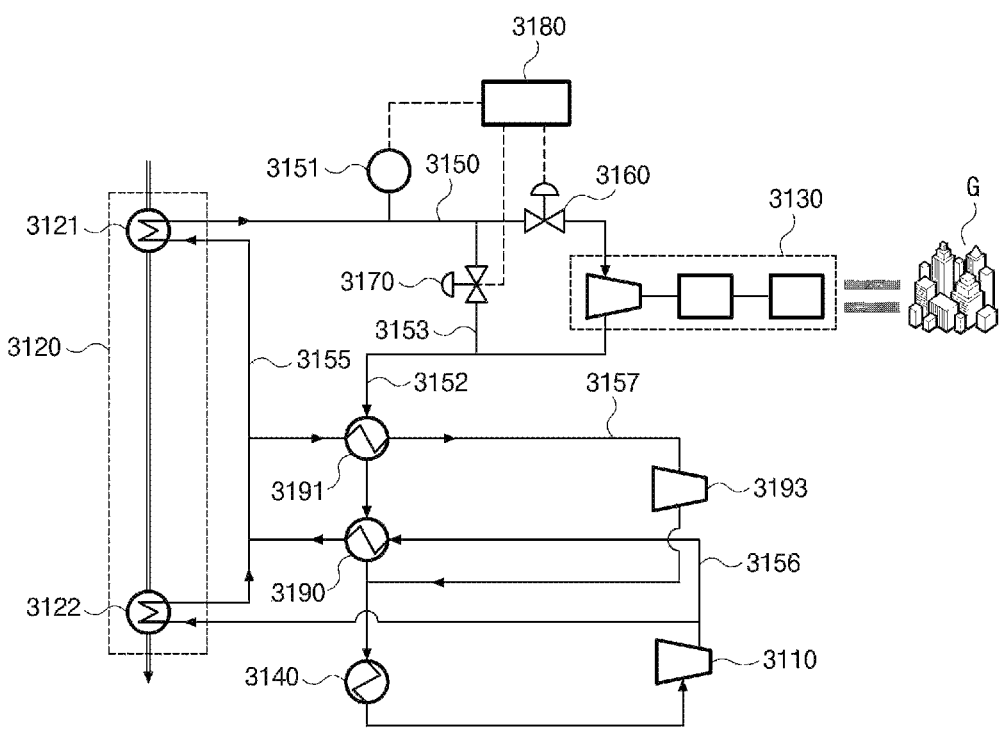
FIG. 4 is a schematic diagram illustrating a power plant according to a third embodiment of the present disclosure.

FIG. 4 is a schematic diagram illustrating a power plant according to a third embodiment of the present disclosure.

Referring to FIG. 4, the power plant according to the third embodiment of the present disclosure comprises a pump 3110, a heat exchanger apparatus 3120, a power turbine generator 3130, a condenser 3140, a working fluid supply line 3150, a pressure sensor 3151, a working fluid recovery line 3152, a bypass line 3153 allowing a portion of the working fluid to bypass the power turbine generator 3130, a first and second control valves 3160 and 3170, and a controller 3180 for controlling the first and second control valves 3160 and 3170.

Among the components of the power plant according to the third embodiment of the present disclosure, a description of the same components as those of the second embodiment described above will be omitted and only components that are different from those of the second embodiment will be described below.

The power plant according to the third embodiment of the present disclosure utilizes a cascade cycle. That is, the power plant comprises the cascade cycle-associated components such as a fourth fluid line 3157, a second recuperator 3191, and an auxiliary turbine 3193.

A first end of the fourth fluid line 3157 is connected to the second fluid line 3155, and a second end of the fourth fluid line 3157 is connected to the working fluid recovery line 3152 connected to a rear side of a heat exchanger 3190. The second recuperator 3191 and the auxiliary turbine 3193 are installed on the fourth fluid line 3157.

The second recuperator 3191 heats the working fluid flowing through the fourth fluid line 3157 and cools the working fluid flowing through the working fluid recovery line by causing heat exchange between the working fluid passing through the fourth fluid line 3157 and the working fluid passing through the working fluid recovery line 3152.

The auxiliary turbine 3193 generates a driving force by using the working fluid conveyed to the fourth fluid line 3157 via the second recuperator 3191.

Figure 5:
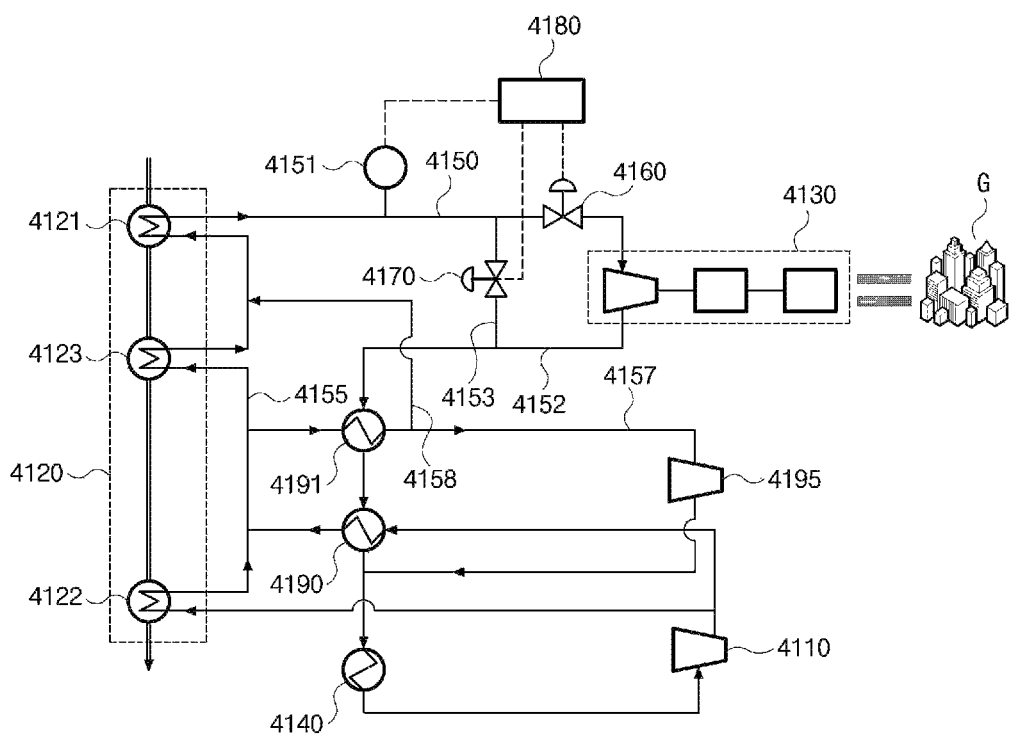
FIG. 5 is a schematic diagram illustrating a power plant according to a fourth embodiment of the present disclosure.

FIG. 5 is a schematic diagram illustrating a power plant according to a fourth embodiment of the present disclosure.

Referring to FIG. 5, a power plant according to the fourth embodiment of the present disclosure comprises a pump 4110, a heat exchanger apparatus 4120, a power turbine generator 4130, a condenser 4140, a working fluid supply line 4150, a pressure sensor 4151, a working fluid recovery line 4152, a bypass line 4153 allowing a portion of the working fluid to bypass the power turbine generator 4130, a first and second control valves 4160 and 4170, and a controller 4180 for controlling the first and second control valves 4160 and 4170.

Among the components of the power plant according to the fourth embodiment of the present disclosure, a description of the same components as those of the third embodiment described above will be omitted and only components that are different from those of the third embodiment will be described below.

The power plant according to the fourth embodiment of the present disclosure utilizes a cascade cycle. Therefore, the power plant according to the fourth embodiment comprises the cascade cycle-associated components such as a fourth fluid line 4157, a second recuperator 4191, an auxiliary pump 4195, and a fifth fluid line 4158.

A first end of the fourth fluid line 4157 is connected to a second fluid line 4155, and a second end of the fourth fluid line 4157 is connected to the working fluid recovery line 4152 connected to the rear side of a first recuperator 4190. The second recuperator 4191 and the auxiliary pump 4195 are installed on the fourth fluid line 4157.

The second recuperator 4191 heats the working fluid flowing through the fourth fluid line 4157 and cools the working fluid flowing through the working fluid recovery line 4152 by causing heat exchange between the working fluid passing through the fourth fluid line 4157 and the working fluid passing through the working fluid recovery line 4152.

The auxiliary pump 4195 pressurizes the working fluid which is a branch flow split off from the flow of the second fluid line 4155 and transfers the pressurized working fluid to the working fluid recovery line 4152.

The heat exchanger apparatus 4120 comprises a first heat exchanger 4121, a second heat exchanger 4122, and a third heat exchanger 4123. The third heat exchanger 4123 is installed on the second fluid line 4155. The third heat exchanger 4123 is disposed between the first heat exchanger 4121 and the second heat exchanger 4122 and is configured to heat the working fluid conveyed through the second fluid line 4155 by causing heat exchange between the working fluid conveyed through the second fluid line 4255 and an external heat source.

The fifth fluid line 4158 transfers a portion of the working fluid, which is conveyed from the second recuperator 4191 to the fourth fluid line 4157, to the second fluid line 4155. A first end of the fifth fluid line 4158 is connected to the second fluid line 4155 disposed on the rear side of the third heat exchanger 4123, and a second end of the fifth fluid line 4158 is connected to the fourth fluid line 4157.

Figure 6:
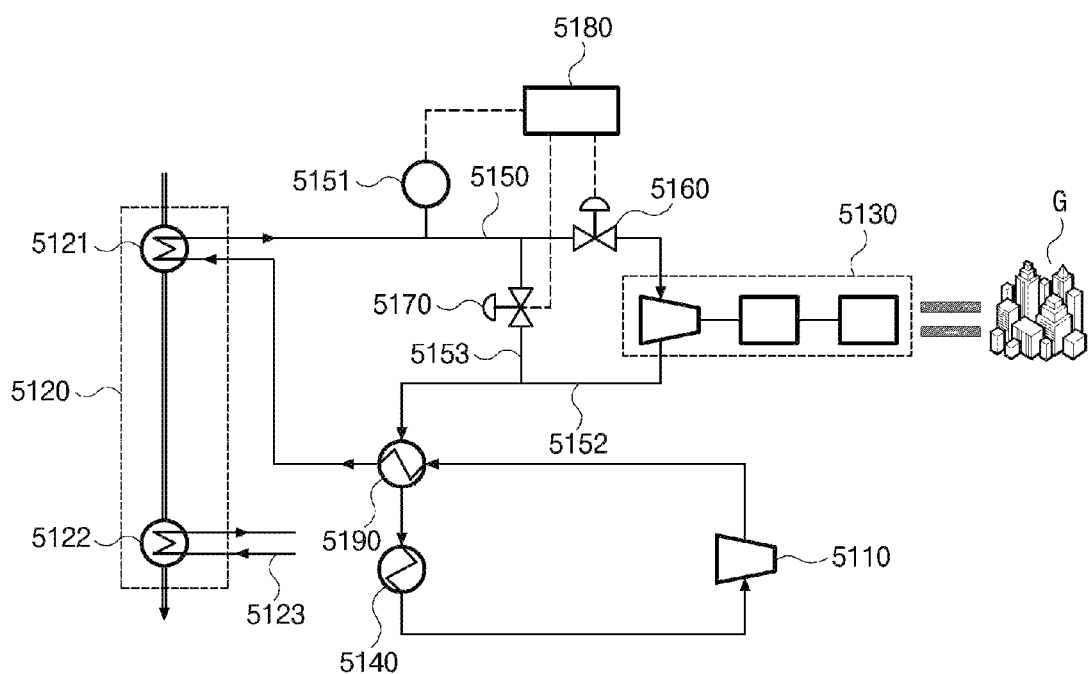
FIG. 6 is a schematic diagram illustrating a power plant according to a fifth embodiment of the present disclosure

FIG. 6 is a schematic diagram illustrating a power plant according to a fifth embodiment of the present disclosure.

Referring to FIG. 6, the power plant according to the fifth embodiment of the present disclosure comprises a pump 5110, a heat exchanger apparatus 5120, a power turbine generator 5130, a condenser 5140, a working fluid supply line 5150, a pressure sensor 5151, a working fluid recovery line 5152, a bypass line 5153 allowing a portion of the working fluid to bypass the power turbine generator 5130, a first and second control valves 5160 and 5170, and a controller 5180 for controlling the first and second control valves 5160 and 5170.

The power plant according to the fifth embodiment of the present disclosure uses a simple recuperation cycle and is characterized in that it can transfer heat to an external system or apparatus using a heat medium.

Among the components of the power plant according to the fifth embodiment of the present disclosure, a description of the same components as those of the first embodiment described above will be omitted. Therefore, a first heat exchanger 5121 and a second heat exchanger 5122 which are components different from the heat exchanger apparatus of the first embodiment will be described below.

The first heat exchanger 5121 heats the working fluid that is first discharged from the pump and is then conveyed to the first heat exchanger 5121 through the recuperator 5190, by causing heat exchange between the working fluid and an external heat source.

The recuperator 5190 heats the working fluid conveyed from the pump 5110 by causing heat exchange between the working fluid conveyed from the pump 5110 and the working fluid discharged from the power turbine generator 5130, and then supplies the resulting heated working fluid to the first heat exchanger 5121.

The second heat exchanger 5122 is spaced apart from and is arranged in series with the first heat exchanger 5121 and is configured to have a flow path for a heat medium 5123 therein. Thus, the second heat exchanger 5122 heats the heat medium 5123 by using an external heat source. The heated heat medium may be discharged to an external system, thereby transferring thermal energy to the external system.

While the present disclosure has been described with reference to exemplary embodiments, those skilled in the art will appreciate that the exemplary embodiments are presented only for illustrative purposes and the present disclosure is not limited to the disclosed exemplary embodiments. On the contrary, it will be understood that various modifications and equivalents thereof are possible. Accordingly, the true technical protection scope of the present disclosure should be determined by the technical idea defined in the appended claims.

What is claimed is:

1. A power plant comprising:
a pump configured to compress a working fluid;
a heat exchanger apparatus configured to cause heat exchange between the working fluid transferred from the pump and an external heat source;
a power turbine generator configured to generate a rotational force by using the working fluid heated through the heat exchange performed in the heat exchanger apparatus, to generate electricity using the rotational force, and to supply the electricity to an electrical grid, the power turbine generator operating during a first operation session in which synchronization with the electrical grid is performed, during a second operation session in which the power turbine generator operates in synchronization with the electrical grid after the synchronization with the electrical grid is successfully performed through the first operation session, and during a third operation session in which a shut-down operation is performed during the second operation session, the power turbine generator exhibiting an inlet pressure and operating during the second operation session between upper and lower limits of a normal range of the inlet pressure;

a condenser configured to cool the working fluid discharged from the power turbine generator;

a working fluid supply line connected to the heat exchanger apparatus and the power turbine generator at respective ends thereof to provide a flow path from the heat exchanger apparatus to the power turbine generator for the working fluid discharged from the heat exchanger apparatus;

a pressure sensor installed on the working fluid supply line and configured to measure a pressure of the working fluid supplied to the power turbine generator and to output a measurement value indicative of the inlet pressure of the power turbine generator;

a working fluid recovery line connected to the power turbine generator and the condenser at respective ends thereof to provide a flow path from the power turbine generator to the condenser for the working fluid;

a bypass line connected to the working fluid supply line and the working fluid recovery line at respective ends thereof to cause a portion of the working fluid flowing through the working fluid supply line to bypass the power turbine generator and to directly flow to the working fluid recovery line;

a controller comprising a first controller and a second controller;

a first control valve installed on the working fluid supply line and controlled by the first controller to control a flow rate of the working fluid flowing through the working fluid supply line according to a rotational speed of a turbine in the power turbine generator during the first operation session and to control the flow rate of the working fluid flowing through the working fluid supply line according to the measurement value of the pressure sensor during the second operation session; and a second control valve installed on the bypass line and controlled by the second controller to have an open state to control a flow rate of the working fluid flowing through the bypass line according to the measurement value of the pressure sensor during the first operation session, the flow rate through the second control valve rising during the first operation session, wherein the first controller is configured to automatically switch from a first mode corresponding to the first operation session in which the first controller controls the first control valve based on the rotational speed of the turbine to a second mode corresponding to the second operation session in which the first controller controls the first control valve based on the inlet pressure of the power turbine generator and is further configured to perform the second mode by increasing an opening of the first control valve when the measurement value of the pressure sensor reaches the lower limit of the normal range of the inlet pressure, and to completely close the opening of the first control valve in response to a shut-down command initiating the third operation session, and wherein the second controller is configured to control the second control valve to have the open state to control the flow rate of the working fluid flowing through the bypass line according to the measurement value of the pressure sensor during the first operation session, the flow rate through the second control valve rising during the first operation session, and is further configured to change the open state of the second control valve by increasing an opening of the second control valve when the measurement value of the pressure sensor reaches the upper limit of the normal range during the second operation session, and to gradually increase the open state of the second control valve in response to the shut-down command, the gradual increasing performed according to the measurement value of the pressure sensor.

2. The power plant according to claim 1, further comprising:

a recuperator installed on the working fluid recovery line and configured to cause heat exchange between the working fluid conveyed through the working fluid recovery line and the working fluid transferred from the pump, thereby cooling the working fluid conveyed through the working fluid recovery line.

3. The power plant according to claim 2, wherein the heat exchanger apparatus comprises:

a first heat exchanger configured to heat the working fluid transferred from the pump by causing heat exchange between the working fluid transferred from the pump and the external heat source; and a second heat exchanger configured to heat a portion of the working fluid transferred from the pump, the portion being the working fluid conveyed through the recuperator, by causing heat exchange between the working fluid conveyed through the recuperator and the external heat source.

4. The power plant according to claim 3, wherein the external heat source is hot exhaust gas, the first heat exchanger and the second heat exchanger are arranged in series and spaced from each other, and the hot exhaust gas sequentially passes through the first heat exchanger and the second heat exchanger to exchange heat with the working fluid.

5. The power plant according to claim 3, wherein the pump comprises:

a centrifugal pump configured to compress the working fluid conveyed from the condenser for supply of the compressed working fluid; and an auxiliary turbine coaxially connected to a rotational shaft of the centrifugal pump and configured to generate a rotational force by using the working fluid supplied from the second heat exchanger to rotate the rotational shaft.

6. The power plant according to claim 5, further comprising a first fluid line connected to an outlet of the auxiliary turbine and the working fluid recovery line at respective ends thereof to provide a flow path from the auxiliary turbine to the working fluid recovery line for the working fluid discharged from the auxiliary turbine.

7. The power plant according to claim 2, wherein the heat exchanger apparatus comprises:

a first heat exchanger configured to heat a portion of the working fluid transferred from the pump by causing heat exchange between the working fluid conveyed through the recuperator and the external heat source;
a second heat exchanger configured to heat the working fluid transferred from the pump by causing heat exchange between the working fluid transferred from the pump and the external heat source;
a second fluid line connected to the first heat exchanger and the second heat exchanger at respective ends thereof to provide a flow path from the second heat exchanger to the first heat exchanger for the working fluid discharged from the second heat exchanger; and
a third fluid line connected to the pump and the second fluid line at respective ends thereof to provide a flow path that runs from the pump to the second fluid line through the recuperator.

8. The power plant according to claim 7, further comprising:
a fourth fluid line connected to the second fluid line and the working fluid recovery line disposed on a rear side of the recuperator, at respective ends thereof;
a second recuperator installed on the fourth fluid line and configured to cause heat exchange between the working fluid conveyed through the fourth fluid line and the working fluid conveyed through the working fluid recovery line; and
an auxiliary turbine installed on the fourth fluid line configured to generate a driving force by using the working fluid conveyed through the fourth fluid line.

9. The power plant according to claim 2, wherein the heat exchanger apparatus comprises:
a first heat exchanger configured to heat a portion of the working fluid, which is first transferred from the pump and then conveyed through the recuperator, to the first heat exchanger by causing heat exchange between the working fluid conveyed through the recuperator and the external heat source; and
a second heat exchanger arranged on one side of the first heat exchanger and configured to heat a heat medium passing through the second heat exchanger by using the external heat source.

10. The power plant according to claim 1, wherein the working fluid is supercritical carbon dioxide.

11. The power plant according to claim 1, wherein the first controller is configured to control the first control valve according to the rotational speed of the turbine in order to control the flow rate of the working fluid supplied to the power turbine generator before the first operation session.

12. The power plant according to claim 1, wherein the power turbine generator is further configured to operate during an emergency shutdown in which the first controller closes the opening of the first control valve completely and the second controller fully opens the opening of the second control valve.

13. A power plant comprising:
a main pump configured to compress a working fluid;
an auxiliary pump configured to compress the working fluid for supply of the compressed working fluid;
a heat exchanger apparatus configured to cause heat exchange between the working fluid transferred from the main pump and an external heat source;
a power turbine generator configured to generate a rotational force by using the working fluid heated through the heat exchange performed in the heat exchanger apparatus, to generate electricity using the rotational force, and to supply the electricity to an electrical grid;
a condenser configured to cool the working fluid discharged from the power turbine generator;
a working fluid supply line having ends respectively connected to the heat exchanger apparatus and the power turbine generator to provide a flow path from the heat exchanger apparatus to the power turbine generator for the working fluid discharged from the heat exchanger apparatus;
a pressure sensor installed on the working fluid supply line and configured to measure a pressure of the working fluid supplied to the power turbine generator;
a working fluid recovery line having ends respectively connected to the power turbine generator and the condenser to provide a flow path from the power turbine generator to the condenser for the working fluid;
a first recuperator installed on the working fluid recovery line and configured to cause heat exchange between the working fluid conveyed through the working fluid recovery line and the working fluid transferred from the main pump;
a first heat exchanger configured to heat a portion of the working fluid transferred from the main pump by causing heat exchange between the working fluid conveyed through the first recuperator and the external heat source;
a second heat exchanger configured to heat the working fluid transferred from the main pump by causing heat exchange between the working fluid transferred from the main pump and the external heat source and to discharge working fluid to the first heat exchanger via a second fluid line, the second fluid line communicating with a third fluid line providing a flow path from the main pump to the second fluid line through the first recuperator and communicating with a fourth fluid supply line providing a flow path to the auxiliary pump;
a second recuperator installed on the fourth fluid line and configured to cause heat exchange between the working fluid conveyed through the fourth fluid line and the working fluid conveyed through the working fluid recovery line;
a bypass line having ends respectively connected to the working fluid supply line and the working fluid recovery line to cause a portion of the working fluid flowing through the working fluid supply line to bypass the power turbine generator and to directly flow to the working fluid recovery line;
a first control valve installed on the working fluid supply line and configured to control a flow rate of the working fluid flowing through the working fluid supply line;
a second control valve installed on the bypass line and configured to control a flow rate of the working fluid flowing through the bypass line; and
a controller configured to control the first control valve and the second control valve according to the measurement value of the pressure sensor and an operational state of the power turbine generator.

14. The power plant according to claim 13, further comprising:
a third heat exchanger installed on the second fluid line and configured to heat the working fluid conveyed through the second fluid line by causing heat exchange between the working fluid conveyed through the second fluid line and the external heat source.

15. The power plant according to claim 14, further comprising:
a fifth fluid line connected to the second fluid line disposed at a rear side of the third heat exchanger and to the fourth fluid line, at respective ends thereof.

* * * * *